United States Patent
Bokor et al.

(10) Patent No.: US 9,927,868 B2
(45) Date of Patent: *Mar. 27, 2018

(54) PERSPECTIVE BASED TAGGING AND VISUALIZATION OF AVATARS IN A VIRTUAL WORLD

(71) Applicant: International Business Machines Corporation, Armonk, NY (US)

(72) Inventors: Brian R. Bokor, Raleigh, NC (US); Daniel E. House, Raleigh, NC (US); William B. Nicol, II, Durham, NC (US); Andrew B. Smith, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 190 days.

This patent is subject to a terminal disclaimer.

(21) Appl. No.: 14/884,443

(22) Filed: Oct. 15, 2015

(65) Prior Publication Data

US 2016/0034028 A1    Feb. 4, 2016

Related U.S. Application Data (63) Continuation of application No. 13/900,111, filed on May 22, 2013, now Pat. No. 9,195,363, which is a continuation of application No. 11/972,064, filed on Jan. 10, 2008, now Pat. No. 8,495,505.

(51) Int. Cl.
*G06F 3/01* (2006.01)
*G06F 3/0481* (2013.01)
*G06F 3/0484* (2013.01)

(52) U.S. Cl.
CPC ............... *G06F 3/011* (2013.01); *G06F 3/01* (2013.01); *G06F 3/0481* (2013.01); *G06F 3/04842* (2013.01); *G06F 3/04847* (2013.01)

(58) Field of Classification Search
CPC .................................. G06F 3/01; G06F 3/0484
See application file for complete search history.

(56) References Cited

U.S. PATENT DOCUMENTS

| | | | |
|---|---|---|---|
| 6,366,285 B1 | 4/2002 | Brush, II et al. | |
| 6,396,509 B1* | 5/2002 | Cheng | G06F 3/011 345/419 |
| 6,954,902 B2 | 10/2005 | Noma et al. | |
| 7,036,082 B1 | 4/2006 | Dalrymple et al. | |
| 7,213,206 B2 | 5/2007 | Fogg | |
| 7,529,797 B2* | 5/2009 | Tseng | G06F 17/3089 709/201 |
| 7,667,705 B2 | 2/2010 | Sterchi et al. | |
| 7,668,821 B1* | 2/2010 | Donsbach | G06F 17/30867 707/765 |
| 8,938,679 B1* | 1/2015 | Hsu | G06F 3/0486 715/230 |

(Continued)

*Primary Examiner* — David Choi
(74) *Attorney, Agent, or Firm* — Charles L. Moore; Moore & Van Allen PLLC (57) ABSTRACT

A system for perspective based tagging and visualization of avatars in a virtual world may include determining if another avatar has moved within a predetermined proximity range of a user's avatar in a virtual world. The system may also include allowing the user to tag the other avatar with information in response to the other avatar being within the predetermined proximity range of the user's avatar.

20 Claims, 6 Drawing Sheets

(56) References Cited

U.S. PATENT DOCUMENTS

| | | | |
|---|---|---|---|
| 9,037,455 B1* | 5/2015 | Faaborg | G10L 21/00 704/208 |
| 2005/0256867 A1* | 11/2005 | Walther | G06F 17/30696 |
| 2007/0043688 A1* | 2/2007 | Kountz | G06F 17/241 |
| 2007/0203645 A1 | 8/2007 | Dees et al. | |
| 2008/0026839 A1* | 1/2008 | Alringer | A63F 1/00 463/31 |
| 2008/0091723 A1 | 4/2008 | Zuckerberg et al. | |
| 2009/0113313 A1* | 4/2009 | Abernethy, Jr. | A63F 13/12 715/757 |
| 2009/0150804 A1* | 6/2009 | Bokor | G06Q 10/10 715/758 |
| 2011/0128281 A1* | 6/2011 | Bhogal | G06F 3/04815 345/419 |
| 2013/0254684 A1* | 9/2013 | Smith | G06F 3/01 715/757 |
| 2014/0006129 A1* | 1/2014 | Heath | G06Q 30/0222 705/14.23 |

* cited by examiner

PERSPECTIVE BASED TAGGING AND VISUALIZATION OF AVATARS IN A VIRTUAL WORLD

CROSS REFERENCE TO RELATED APPLICATION

This application a continuation application of U.S. patent application Ser. No. 11/972,064 entitled "PERSPECTIVE BASED TAGGING AND VISUALIZATION OF AVATARS IN A VIRTUAL WORLD" and filed Jan. 10, 2008, the contents of which are incorporated herein by reference in its entirety.

BACKGROUND OF THE INVENTION

The present invention relates to simulations, virtual world simulations of the real-world or real-life or a virtual world and the like, and more particularly to a system and method for perspective based tagging and visualization of avatar in a virtual world.

Computer based simulations are becoming more ubiquitous. Simulations may be used for training purposes, for entertainment or for other purposes. Computer simulations such as Second Life™ or similar simulations present a virtual world which allows users or players to be represented by characters known as avatars. Second Life is a trademark of Linden Research, Inc. in the United States, other countries or both. Second Life is an Internet-based virtual world launched in 2003 by Linden Research, Inc. A downloadable client program called the Second Life Viewer enables users, called "Residents", to interact with others in the virtual world through motional avatars. The virtual world basically simulates the real world or environment. The users or residents via their avatar can explore the virtual world, meet other users or residents, socialize, participate in individual and group activities, create and trade items (virtual property) and services from one another.

As peer and social networks expand into virtual world realms, it is becoming increasingly difficult for a user to keep track of avatars that the user has met. Additionally, many avatars in the virtual world look alike and an avatar's appearance may frequently change. Accordingly, it is difficult for users to remember the identity of an avatar or what interactions, if any, the user has had with a particular avatar based on the visualization of the avatar or the avatars name. Currently, a user may view an avatar's profile, but this is tedious and is dependent on the avatar entering adequate information into his profile. Nevertheless, there is no way to link the identity of a particular avatar (e.g. the name, visual representation, avatar identity, etc.) with the relevance of that avatar to the user's avatar (e.g. co-worker, customer, friend, new acquaintance, interactions the user has had with the avatar, etc.). Additionally, there is no way to automatically present the user with customized information about each specific avatar when the avatar comes into contact with the user's avatar.

BRIEF SUMMARY OF THE INVENTION

In accordance with an aspect of the present invention, a method for perspective based tagging and visualization of avatars in a virtual world may include determining if another avatar has moved within a predetermined proximity range of a user's avatar in a virtual world. The method may also include allowing the user to tag the other avatar with information in response to the other avatar being within the predetermined proximity range of the user's avatar.

In accordance with an aspect of the embodiments of the invention, a system for perspective based tagging and visualization of avatars in a virtual world may include a processor and a module operable on the processor for determining if a physical position of any avatars is within a predetermined proximity range that encompasses a user's avatar in the virtual world. The system may also include a module operable on the processor for, in response to the physical position of any avatars being within the predetermined proximity range of the user's avatar, allowing the user to enter information to tag any of the any avatars with tagged information. The system may further include a module operable on the processor for automatically presenting the tagged information to the user when any of the any avatars that have been previously tagged by the user are within the predetermined proximity range of the user's avatar, wherein the tagged information is only presented to the user and not to users of the any avatars. The system may still further include a module operable on the processor for allowing the user to turn off automatically presenting the tagged information for a selected previously tagged one or more of the any avatars even if the selected previously tagged one or more of the any avatars is within the predetermined proximity range of the user's avatar.

In accordance with another aspect of the embodiments of the invention, the system may further include a module for determining if the user has previously tagged any avatars with the information in response to any avatars coming within the predetermined proximity range of the user's avatar. The system may further include a module for presenting the tagged information in at least one of a visual form and an audible form. The system may still further include a module for presenting an interface for the user to modify the tagged information previously entered by the user.

In another aspect of the embodiments of the invention, the system may further include a module for allowing the user to select any avatars within the predetermined proximity range for tagging the information and presenting an interface for the user to enter the information to be tagged to any avatars within the predetermined proximity range in response to the user selecting any avatars within the predetermined proximity range. The system may further include a module for allowing the user to define properties for automatically presenting the tagged information.

In another aspect of the embodiments of the invention, the system may further include a module for allowing the user to define a format for automatically presenting the tagged information to the user; allowing the user to define a frequency for automatically presenting the tagged information; and allowing the user to define a duration for automatically presenting the tagged information. The system may further include a module for allowing the user to define at least one of visual and auditory information for the tagged information. The system may still further include a module for storing the tagged information and associated settings locally in an inventory associated with the user.

In another aspect of the embodiments of the invention, the system may further include a module for allowing the tagged information and associated settings to be shared with another user and the user of the any avatar. The system may further include a module for allowing the user to enter information that is pertinent from a perspective of the user. The system may still further include a module for allowing the user to enter information to identify any avatar to the user and to present a relevance of that any avatar to the user's avatar in the virtual world. The system may also include module for allowing a management entity to update and modify the tagged information.

In an aspect of the embodiments of the invention, a system for perspective based tagging and visualization of avatars in a virtual world may include a processor and a module operable on the processor for determining if a physical position of any avatars is within a predetermined proximity range that encompasses a user's avatar in the virtual world. In another aspect, the system may include a module operable on the processor for determining if the user has previously tagged any avatar that is within the predetermined proximity range with tagged information, wherein the tagged information comprises at least an audible statement pre-recorded by the user. In another aspect, the system may include a module operable on the processor for permitting the user to tag the any avatar with additional information in response to the any avatar coming within the predetermined proximity range of the user's avatar and edit the tagged information in response to the any avatar coming within the predetermined proximity range of the user's avatar and the user having previously tagged the any avatar with information.

In another aspect of the embodiments of the invention, the system may include a module operable on the processor for automatically presenting the tagged information to the user in response to the any avatar coming within the predetermined proximity range of the user's avatar and the user having previously tagged the any avatar with the tagged information, wherein the tagged information is only presented to the user and not to users of the any avatars. The system may also include a module for permitting the user to tag the any avatar with information related to an identification of the any avatar and a relevance of the any avatar to the user's avatar in the virtual world. The system may still further include a module for allowing the user's avatar to transfer the tagged information for any avatar within the predetermined proximity range to any further avatar in the virtual world.

In another aspect of the embodiments of the invention, the system may include a module for permitting the user to tag another avatar within the predetermined proximity range with information in response to the another avatar coming within the predetermined proximity range of the user's avatar and the user not having previously tagged the another avatar with information. The system may also include a module for allowing the user to define properties for presenting the tagged information.

In an aspect of the embodiments of the invention, a computer program product for perspective based tagging and visualization of avatars in a virtual world may include a computer readable storage medium having computer readable program code embodied therewith. In another aspect, the computer readable computer program code may include computer readable program code configured to determine if a physical position of any avatars is within a predetermined proximity range that encompasses a user's avatar in the virtual world. In another aspect, the computer readable computer program code may include computer readable program code configured to, in response to the physical position of any avatars being within the predetermined proximity range of the user's avatar, allow the user to enter information to tag any of the any avatars with tagged information. In another aspect, the computer readable computer program code may include computer readable program code configured to automatically present the tagged information to the user when any of the any avatars that have been previously tagged by the user are within the predetermined proximity range of the user's avatar, wherein the tagged information is only presented to the user and not to users of the any avatars. In another aspect, the computer readable computer program code may include computer readable program code configured to allow the user to turn off automatically presenting the tagged information for a selected previously tagged one or more of the any avatars even if the selected previously tagged one or more of the any avatars is within the predetermined proximity range of the user's avatar.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
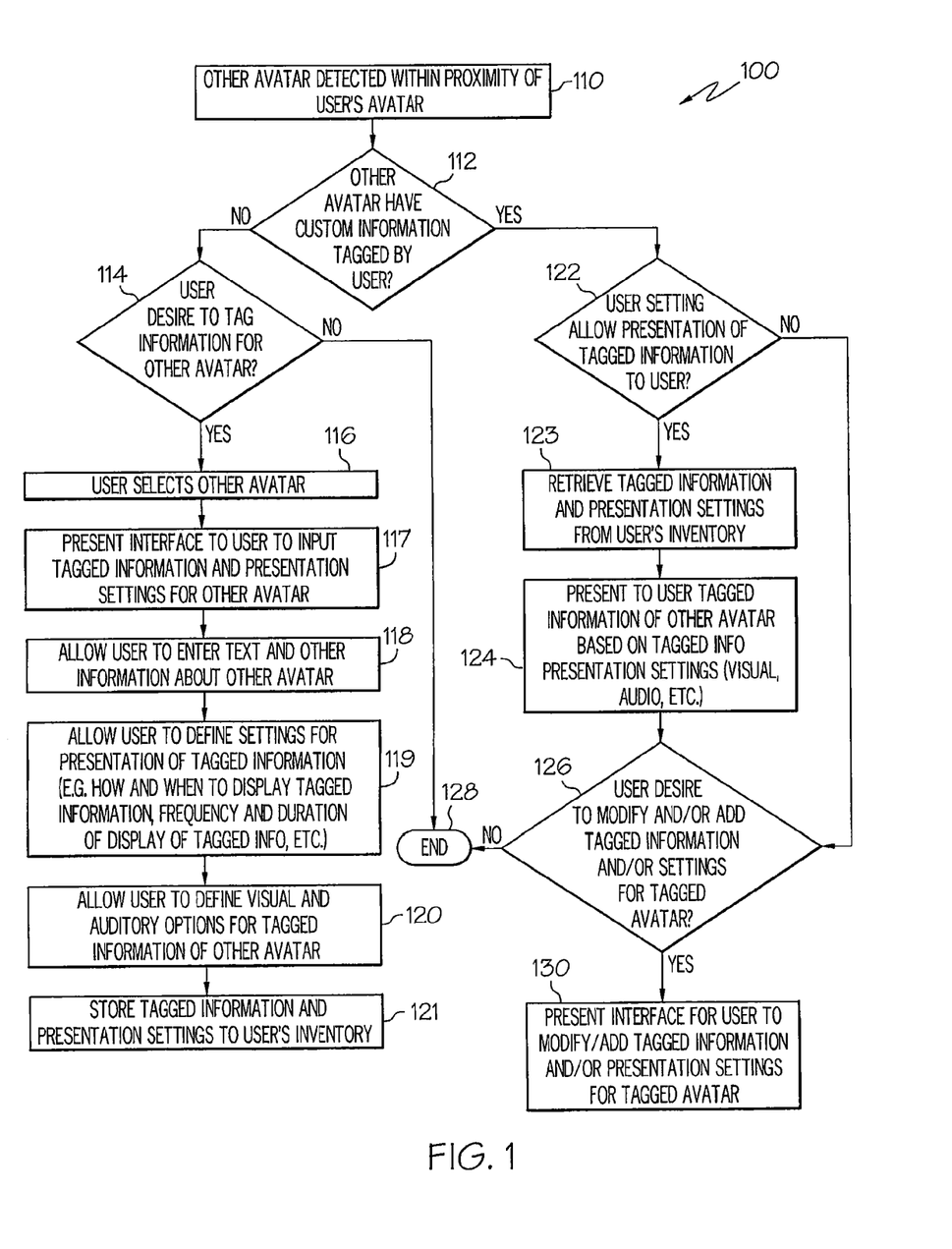
FIG. 1 is a flow chart of an example of a method for perspective based tagging and visualization of avatars in a virtual world in accordance with an embodiment of the present invention.
Figure 2A:
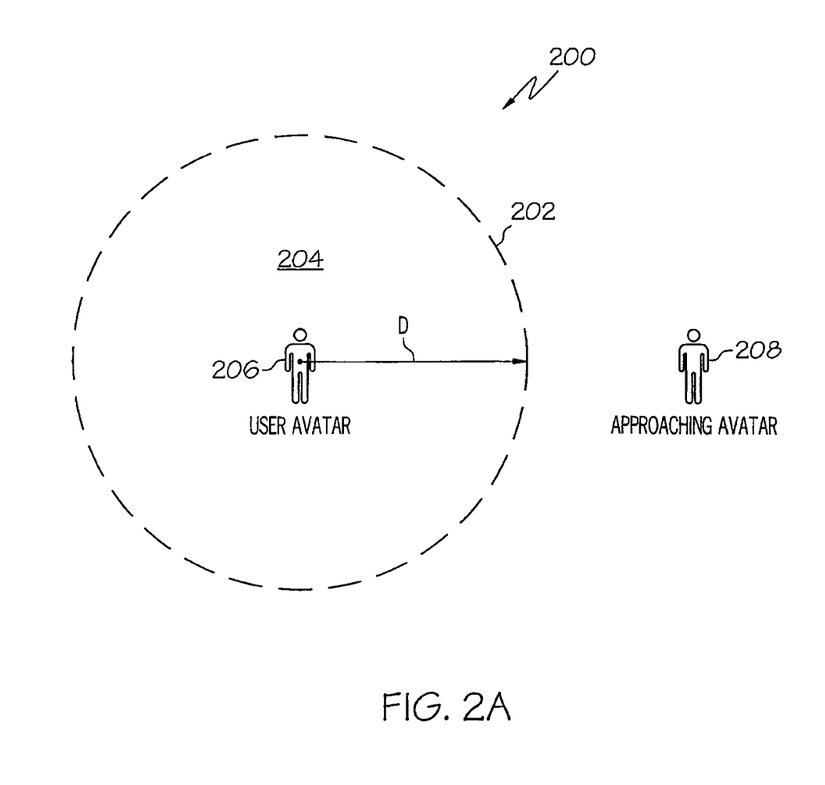
FIG. 2A is an illustration of an example of a portion of a virtual world illustrating a predetermined proximity range of a user's avatar in accordance with an embodiment of the present invention.
Figure 2B:
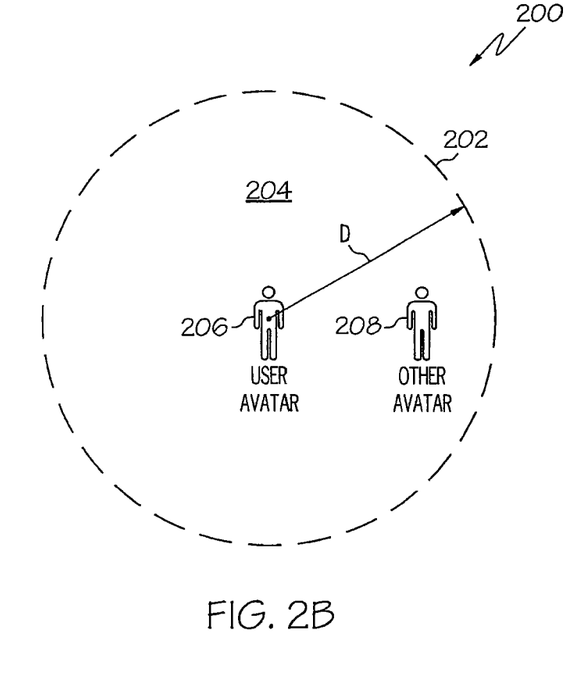
FIG. 2B is an illustration of an example of another avatar coming within the predetermined proximity range of the user's avatar in the virtual world portion of FIG. 2A to permit perspective based tagging and visualization of the other avatar in accordance with an embodiment of the present invention.

FIG. 1 is a flow chart of an example of a method 100 for perspective based tagging and visualization of avatars in a virtual world in accordance with an embodiment of the present invention. In block 110, another avatar is determined to be within the predetermined proximity range of the user's avatar. The other avatar may move into the predetermined proximity range of the user's avatar in the virtual world through actions of the other user controlling the other avatar, and/or the user may move his avatar such that the predetermined proximity range of the user's avatar encompasses the other avatar. Referring also to FIG. 2A, FIG. 2A is an illustration of an example of a portion of a virtual world 200 illustrating a predetermined proximity range 202 in accordance with an embodiment of the present invention. The portion of the virtual world 200 may be presented to the user on a display of a computer device as described herein. The perimeter of the predetermined proximity range 202 is illustrated by a dashed or broken line in FIGS. 2A and 2B and defines an area 204 surrounding the user's avatar 206 in FIGS. 2A and 2B. The predetermined proximity range 202 may be a two-dimensional or three-dimensional range extending a predetermined distance D from the user's avatar in any direction. The predetermined proximity range 202 may be substantially circular as illustrated in FIGS. 2A and 2B or may be shape selected by the user. FIG. 2A illustrates an avatar 208 of another user that may be approaching the user's avatar 206 from outside of the predetermined proximity range 202.

Referring also to FIG. 2B, FIG. 2B illustrates the other avatar 208 coming within the predetermined proximity range 202 of the user's avatar 206 either by movement of the other avatar 208, the user's avatar 206 or both. If the other avatar 208 has been previously tagged with information by the user, the tagged information may be presented to the user visually, audibly or both, as described herein, in response to the other avatar coming within the predetermined proximity range. The user may also edit the tagged information. If the other avatar 208 has not been previously tagged with information, the user may be allowed to tag the other avatar 208 with information in response to the other avatar being within the predetermined proximity range of the user's avatar 206, as further described herein.

Referring back to FIG. 1, when another avatar is determined to be within the predetermined proximity range 202 of the user's avatar 206 as illustrated in FIG. 2B, the method 100 may advance to block 112. In block 112, a determination may be made whether the user has previously tagged the avatar 208 within the proximity range 202 with custom information. If not, the method 100 may advance to block 114.

In block 114, a determination may be made whether the user desires to tag the other avatar 208 that is within the proximity range 202 with information. For example, the user may be presented a graphical user interface to ask the user whether or not the user desires to tag information. Alternatively, the user may indicate his desire to tag information for this avatar by any activation means, such as pressing one or more keyboard keys, clicking a mouse or other computer pointing device, selecting an option on an onscreen menu or the like. If the user does not desire to tag information, then the method may terminate, as shown in block 128.

In block 116, in accordance with an embodiment of the invention, at any time the user wishes to tag information to the other avatar 208, the user may select the other avatar 208 using a computer pointing device or the like. Selecting a particular other avatar may be necessary when there are multiple other avatars within the predetermined proximity range 202 of the user's avatar. In this case, the user must select which avatar is to be tagged with the information. The user may select the other avatar 208 by giving some indication that the other avatar 208 is the avatar the user wishes to tag with information. For example, the user may select the other avatar by choosing the other avatar with the user's mouse, by typing the other avatar's name into a graphical user interface or by other means.

In block 117, the user may be presented a graphical user interface (GUI) to enter tagged information about the other avatar 208. The user may also be presented a GUI to define various display or presentation options for presenting the tagged information. These GUIs may be presented to the user in separate GUIs or may be combined and presented to the user in one GUI. As described herein, the information may be presented in a visual form, audible form, or both. The tagged information may be presented only to the user that entered the tagged information.

In block 118, the user is allowed to enter text and other information about the other avatar 202. The user may enter this information by any means, such as through the GUI as described above. The tagged information may be information that is pertinent from a perspective of the user. For example, the tagged information may include information to identify the other avatar 208 to the user and to present a relevance of the other avatar 208 to the user. The information about the other avatar 208 may include any information, such as the avatar's occupation, the avatar's name, how the user knows the avatar, information obtained by the user based on interactions the user's avatar 206 has had with the other avatar 208, user thoughts about the avatar or any information to define a relevance of the other avatar 208 to the user or the user's avatar 206.

In block 119, the user may be allowed to define settings or properties for the presentation of the tagged information to the user. For example, the user may define a format for presenting the tagged information, such as how the information will be visually or audibly presented to the user, a frequency for presenting the tagged information, a duration for presenting the information to the user, and any other properties for presenting the tagged information. Also, the user may define when to present the tagged information to the user. For example, the user may set the tagged information to be delivered to the user every time a tagged avatar enters the proximity range 202 of the user's avatar 206. The user may set the tagged information to be delivered only once per a certain time period (e.g. once per day, week, month, etc.) that the tagged avatar enters the proximity range 202 of the user's avatar 206. Further, the user may desire to set the tagged information to be delivered at the next meeting between the user's avatar 206 and the tagged avatar. The user may also define the display settings to not present the tagged information to the user at all or only on request of the user.

In block 120, the user may define visual and auditory options or properties for the information tagged to the other avatar 208. Visual options or features the user may set could include a number of symbols, color schemes, or any other visual options which may be desired by the user. Optional text and a legend may be included with the visual options. For example, the user may desire to mark all the user's avatar's co-workers in the virtual world with a certain symbol or optional text so that when any of the avatars come into the proximity range 202 of the user's avatar 206, the user immediately recognizes the other avatar as a co-worker. The audible options or settings would allow the user to present any information to the user via an audible means. For example, any text entered by the user and tagged to another avatar may be read to the user via any text-to-voice reader technologies in response to the other avatar coming within the predetermined proximity range 202 of the user's avatar 206. Another example includes allowing the user to tag preset sound recordings, such as audible alerts or warnings, any pre-recorded sounds or statements by the user or other available pre-recorded sounds.

Figure 3:
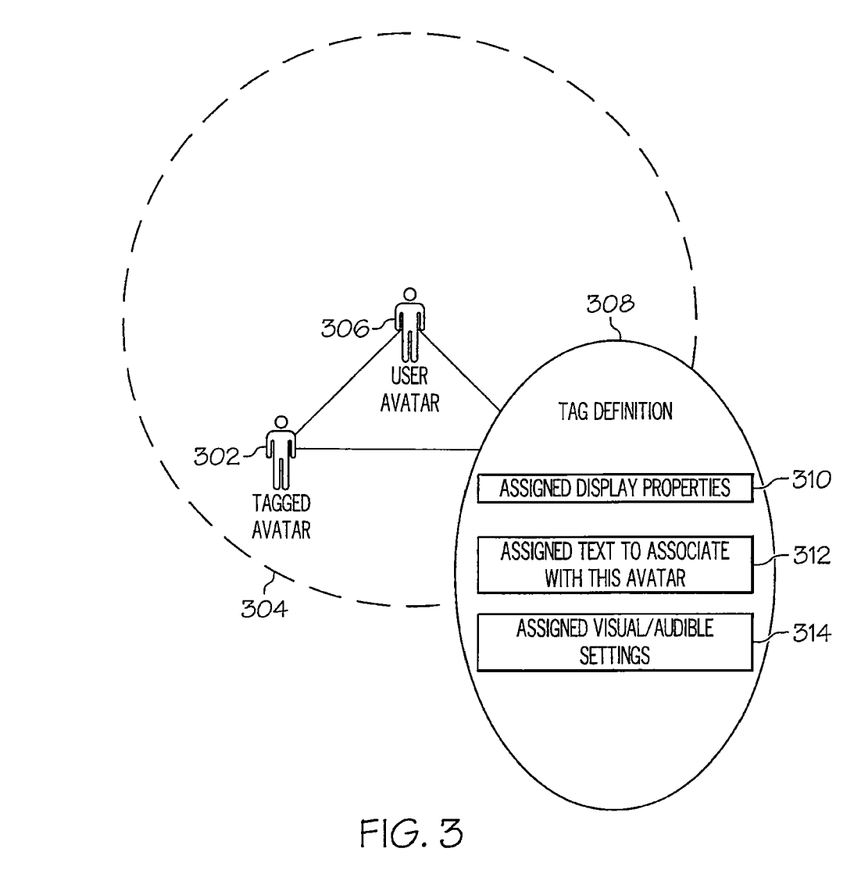
FIG. 3 is an illustration of an example of tagging the other avatar within the predetermined proximity range of the user's avatar in accordance with an embodiment of the present invention.

Referring also to FIG. 3, FIG. 3 is an illustration of an example of tagging another avatar 302 within the predetermined proximity range 304 of the user's avatar 306 in accordance with an embodiment of the present invention. The tagged information and associated settings or properties may be referred to as a tag definition 308 associated with the tagged avatar 302. As described above, the user is allowed to create or define the tag definition 308. The tag definition 308 may include display properties 310 assigned by the user, text 312 assigned or entered by the user to be associated with the tagged avatar 302, visual and/or audible settings 314 assigned by the user, as well as any other information to be tagged to the other or tagged avatar 302 and properties relative to presentation of the tagged information. The tagged definition 308 may typically only be presented to the user that entered or created the tagged definition 308. The user of the tagged avatar 302 may be unaware of the tagged information or tagged definition 308. The tagged definition 308 may be present on a computing device associated with the user similar to that described with reference to FIG. 5.

FIG. 3 may also illustrate an example of delivery or presentation of the tagged information corresponding to the tag definition 306 in accordance with an embodiment of the present invention. Accordingly, when the tagged avatar 302 enters the predetermined proximity range 304, the tag definition 308 associated with the previously tagged avatar 302 may be presented to the user. The user may also be permitted to edit the information and any associated settings or properties in the tag definition 308.

Referring back to FIG. 1, in block 121, any tagged information or tagged information settings or properties may be stored in a database or inventory associated with the user. Each database or inventory may be specific to each user and may be stored locally on the user's computer readable storage medium or remotely on a server.

Referring back to block 112, if the other avatar 208 (FIG. 2B) is within the proximity range 202 of the user's avatar 206 and the user has previously tagged information to the other avatar 208, the method 100 may advance to block 122. In block 122 a determination may be made whether the user's previously entered settings allow presentation of the tagged information to the user. Recall that the user may enter properties to limit presentation of the tagged information under certain circumstance. For example the tagged information may only be presented once per a certain time period, only on request of the user or based on some other parameters. If the user settings allow presentation of the tagged information in block 122, the method 100 may advance to blocks 123 and 124. If not, the method may advance to block 126.

In block 123, the tagged information and any tagged information settings relating to the tagged avatar may be retrieved from the user's inventory, defined above with regard to block 121.

In block 124, the tagged information of the tagged avatar may be presented to the user in accordance with the tagged information settings that the user had previously defined. If no tagged information settings exist, certain settings have not been defined, or none are retrieved, the tagged information may be displayed to the user according to default display settings. As previously described, the tagged information may be visual, auditory or both.

In block 126, a determination may be made whether the user desires to modify and/or add any tagged information and/or settings for the tagged avatar. If the user does not desire to edit the tagged information or settings, the method 100 may end at termination 128. However, if the user desires to perform one or more of the above actions, the method 100 may advance to block 130. To determine whether the user desires to edit the tagged information and settings, the user may indicate so by any means, such as entering such information in a GUI, selecting the tagged avatar, clicking the mouse, clicking an on-screen pull-down menu, pressing one or more keys on the keyboard, or other action.

In block 130, one or more GUIs may be presented to the user to modify tagged information and/or tagged information settings for the tagged avatar. Additionally, one or more GUIs may allow for the user to add tagged information or define tagged information settings. It should be noted that all of the above GUIs may be combined into one GUI to perform one or more of the above actions.

Figure 4:
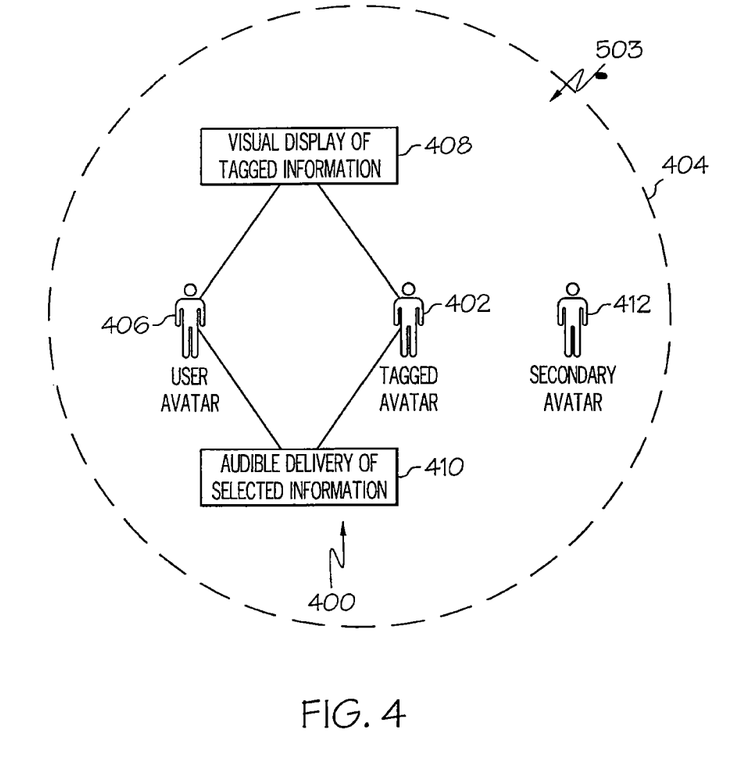
FIG. 4 is an illustration of an example of presentation of tagged information to the user when a tagged avatar is or comes within the predetermined proximity range of the user's avatar in accordance with an embodiment of the present invention.

FIG. 4 is an illustration of an example of presentation 400 of tagged information to the user (not shown) when a tagged avatar 402 is or comes within the predetermined proximity range 404 of the user's avatar 406 in accordance with an embodiment of the present invention. As previously discussed with regard to block 120, the presentation 400 of tagged information may include a visual display 408 or an audible presentation 410 of tagged information.

As previously discussed, FIG. 4 may also illustrate that the presentation 410 of tagged information (visual information 408 or audible information 410) may only occur for the user that previously tagged the information to the tagged avatar 402. The tagged information is typically not delivered or presented to the user of the tagged avatar 402 and the user of the tagged avatar 402 may be unaware that his avatar is tagged with information.

FIG. 4 also illustrates an example of managing tagged information in accordance with an embodiment of the present invention. As previously discussed, a user can configure settings or properties associated with tagged information to add additional details or modify settings and delivery or presentation. For example, as interaction levels between avatars may increase and more avatars enter the proximity range 404 of the user's avatar 406, the user may turn off delivery of the tagged information for selected other avatars, such as secondary avatar 412 either because the tagged information is no longer needed or for other reasons. Management of tagged information may be accomplished by the user selecting to manage tagged avatars in a drop down menu, right-clicking a computer pointing device on the other avatar whose tagged information is to be managed or by any other means for selecting or activating features in a computer application, on the Internet or in a virtual world. A GUI or similar mechanism may be presented to permit the user to edit the information, add additional details, modify settings, change delivery properties and the like.

The tagged information may also be shared with other users or user's avatars. As previously discussed with respect to block 121 in FIG. 1, the tagged information may be stored locally in a inventory associated with the user, such as in a file system or memory on the user's computer or server running the virtual world. The tagged information and settings may then be shared or given to other users or avatars of other users in the virtual world. This sharing feature may enable teams of users to share information and operate more effectively in the virtual world or environment.

The following are exemplary embodiments of the present invention. First, a user's avatar may attend a virtual conference and identify a potential follow-up partnership with another avatar. The user may tag the other avatar with the conference name, company name, and possible partnership information. When the user's avatar next encounters the other avatar, as previously described, the tagged information may be presented to the user and the user may immediately recognize the other avatar. Second, as another example, a user may tag members of a virtual book club. When the user next encounters another book club avatar, the user can immediately respond appropriately without delay because the user was presented tagged information and thus the user, understands the other avatar is a member of the book club. Third, as a last example, a user may tag a potential customer avatar in a virtual space with details pertinent to sales. On a follow-up meeting between the user's avatar and the other avatar, the user may receive a notification of the tagged information via predefined methods (visual/audible) enabling the user to provide better customer relations and feedback.

Figure 5:
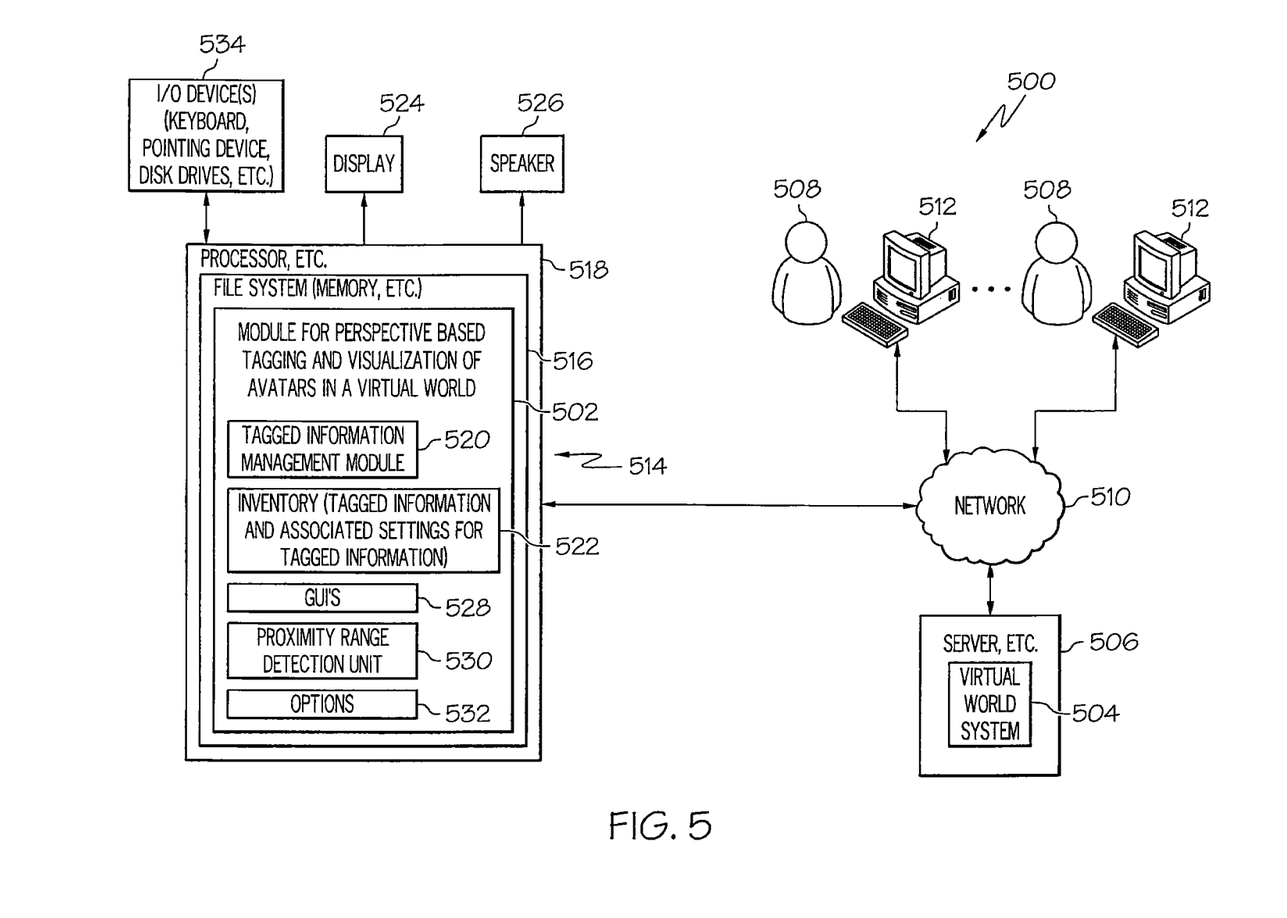
FIG. 5 is a block schematic diagram of an example of a system for perspective based tagging and visualization of avatars in a virtual world in accordance with an embodiment of the present invention.

FIG. 5 is a block schematic diagram of an example of a system 500 for perspective based tagging and visualization of avatars in a virtual world in accordance with an embodiment of the present invention. The system 500 may include a module 502 for perspective based tagging and visualization of avatars in a virtual world (hereinafter "custom tagging module 502"). The method 100 may be embodied in or performed by the custom tagging module 502.

The custom tagging module 502 may be part of a virtual world simulation system 504 or program, such as Second Life™ or similar virtual world system. The virtual world simulation system 504 may be operable on a server 506 which may be accessed by a plurality of users 508 or participants via a network 510 using an Internet browser on a computer system 512, personal computer or similar device. The network 510 may be the Internet, a private network or other network. Each computer system 512 may be similar to the exemplary computer system 514 and associated components illustrated in FIG. 5 for purposes of explaining the embodiment of the present invention illustrated in FIG. 5.

The custom tagging module 502 may be a self contained system with embedded logic, decision making, state based operations and other functions that may operate in conjunction with a virtual world simulation, such as Second Life™.

The self contained system may allow businesses, individuals, services, locations, and the like in the virtual world to interact. The custom tagging module 502 may be stored on a file system 516 or memory of the computer system 514. The custom tagging module 502 may accessed from the file system 516 and run on a processor 518 associated with the computer system 514.

In accordance with another embodiment of the present invention, the custom tagging module 502 may be operable on the server 506 rather than each user's computer system 512 and 514 and may be accessed by the plurality of users 508 or participants via the network 510 using an Internet browser on the computer system 512 or 514 or by similar means.

The custom tagging module 502 may include a tagged information management module 520. The tagged information management module 520 manages the information tagged to other avatars by the user of the computer system 514. For example, the tagged information management module 520 allows presentation of the tagged information for a tagged avatar when the tagged avatar comes within the user's avatar's proximity range.

The tagged information management module 520 may retrieve tagged information and associated settings from a user's inventory 522 and present the tagged information on a display 524, if visual, or via a speaker 526 or speakers, if auditory, in accordance with the tagged information presentation settings. Also, the tagged information module 520 collects the tagged information after the tagged information has been entered by the user and places the tagged information into the user's inventory 522.

The custom tagging module 502 may present one or more predetermined graphical user interfaces 528, similar to the GUIs described with respect to the method 100 of FIG. 1, to permit perspective based tagging of information to other user's avatars. As previously discussed the tagged information is from the user's perspective relative to the other user's avatar, hence perspective based tagging. The perspective based tagged information may assist the user in identifying the other users' avatars as well as a relevance of the other users' avatars to the user's own avatar in the virtual world.

The GUIs 528 may include a GUI to allow the user to enter tagged information and/or tagged information presentation settings. These GUIs 528 may be predetermined and presented in response to the user indicating the user would like to add/or modify information or information presentation settings for another avatar. The predetermined GUIs 528 may be generated by the custom tagging module 502 as described herein and may be presented on the display 524 of the computer system 514.

The custom tagging module 502 may also include a proximity range detection module 530. The proximity range detection module 530 may determine when an avatar comes within the predetermined proximity range of the user's avatar. When an avatar comes within the predetermined proximity range, the proximity range detection module 530 sends an alert to the custom tagging module 502 to present any tagged information or the tag definition 308 as illustrated in FIG. 3.

The custom tagging module 502 may also include inventory 522. The inventory 522 may include tagged information and associated settings for presentation of the tagged information. The inventory may be store locally on the user's computer or the user's computer readable storage medium. The inventory 522 may also be stored remotely on the network 510 in a database (not shown). The custom tagging module 502 may determine if tagged information exists for an avatar that has entered a user's proximity range by checking the user's inventory 522 for information associated the avatar.

The custom tagging module 502 may further include an options feature 532. The options feature 532 may include any future enhancements, configurations, and extensions to the existing system or any additions relating to the custom tagging module 502. As an example, a notification system could be added to the custom tagging module 502 which could be configured as an option to provide instant updates or provide notification by some other mechanism.

The user computer system may also include one or more input devices, output devices or combination input and output device, collectively I/O devices 534 in FIG. 5. The I/O devices 534 may include a keyboard, computer pointing device or similar means to control operation of the custom tagging module 502 and to enter information into the various GUIs as described herein. The I/O devices 534 may also include disk drives or devices for reading computer media including computer-readable or computer-operable instructions.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for perspective based tagging and visualization of avatars in a virtual world, comprising:

determining if a physical position of any avatars is within a predetermined proximity range that encompasses a user's avatar in the virtual world, wherein the predetermined proximity is two-dimensional or three-dimensional;

allowing the user to enter information to tag any of the any avatars with tagged information in response to the physical position of the any avatars being within the predetermined proximity range of the user's avatar;

automatically presenting the tagged information to the user when any of the any avatars that have been previously tagged by the user are within the predetermined proximity range of the user's avatar, wherein the tagged information is only presented to the user and not to users of the any avatars; and allowing the user to turn off automatically presenting the tagged information for a selected previously tagged one or more of the any avatars even if the selected previously tagged one or more avatars is within the predetermined proximity range of the user's avatar.

2. The method of claim 1, further comprising determining if the user has previously tagged any avatars with the information in response to any avatars coming within the predetermined proximity range of the user's avatar.

3. The method of claim 2, wherein automatically presenting the tagged information comprises presenting the tagged information in at least one of a visual form and an audible form.

4. The method of claim 2, further comprising presenting an interface for the user to modify the tagged information previously entered by the user.

5. The method of claim 1, further comprising:
allowing the user to select any avatars within the predetermined proximity range for tagging the information; and
presenting an interface for the user to enter the information to be tagged to any avatars within the predetermined proximity range in response to the user selecting any avatars within the predetermined proximity range.

6. The method of claim 1, further comprising allowing the user to define properties for automatically presenting the tagged information.

7. The method of claim 1, wherein allowing the user to define properties for automatically presenting the tagged information comprises:
allowing the user to define a format for automatically presenting the tagged information to the user;
allowing the user to define a frequency for automatically presenting the tagged information; and
allowing the user to define a duration for automatically presenting the tagged information.

8. The method of claim 1, further comprising allowing the user to define at least one of visual and auditory information for the tagged information.

9. The method of claim 1, further comprising storing the tagged information and associated settings locally in an inventory associated with the user.

10. The method of claim 1, further comprising allowing the tagged information and associated settings to be shared with another user.

11. The method of claim 1, wherein allowing the user to enter information to tag any of the any avatars with tagged information comprises allowing the user to enter information that is pertinent from a perspective of the user.

12. The method of claim 1, wherein allowing the user to enter information to tag any of the any avatars with tagged information comprises allowing the user to enter information to identify that any avatar to the user and to present a relevance of that any avatar to the user's avatar in the virtual world.

13. The method of claim 1, further comprising allowing a management entity to update and modify the tagged information.

14. The method of claim 1, further comprising allowing the user to define a number of times the tagged information is automatically presented to the user within a certain time period in response to the any avatars being within the predetermined proximity range of the user's avatar.

15. A system for perspective based tagging and visualization of avatars in a virtual world, comprising:
a processor;
a module operating on the processor for perspective based tagging and visualization of avatars in the virtual world, the module being configured to perform a set of functions comprising:
determining if a physical position of any avatars is within a predetermined proximity range that encompasses a user's avatar in the virtual world, wherein the predetermined proximity is two-dimensional or three-dimensional;
allowing the user to enter information to tag any of the any avatars with tagged information in response to the physical position of the any avatars being within the predetermined proximity range of the user's avatar;
automatically presenting the tagged information to the user when any of the any avatars that have been previously tagged by the user are within the predetermined proximity range of the user's avatar, wherein the tagged information is only presented to the user and not to users of the any avatars; and
allowing the user to turn off automatically presenting the tagged information for a selected previously tagged one or more of the any avatars even if the selected previously tagged one or more avatars is within the predetermined proximity range of the user's avatar.

16. The system of claim 15, wherein the set of functions further comprises determining if the user has previously tagged any avatars with the information in response to any avatars coming within the predetermined proximity range of the user's avatar.

17. The system of claim 15, wherein automatically presenting the tagged information comprises presenting the tagged information in at least one of a visual form and an audible form.

18. The system of claim 15, wherein the set of functions further comprises:
allowing the user to select any avatars within the predetermined proximity range for tagging the information; and
presenting an interface for the user to enter the information to be tagged to any avatars within the predetermined proximity range in response to the user selecting any avatars within the predetermined proximity range.

19. A computer program product for perspective based tagging and visualization of avatars in a virtual world, the computer program product comprising a computer readable storage medium having program instructions embodied therewith, wherein the computer readable storage medium is not a transitory medium per se, the program instructions being executable by a device to cause the device to perform a method comprising:
determining if a physical position of any avatars is within a predetermined proximity range that encompasses a user's avatar in the virtual world, wherein the predetermined proximity is two-dimensional or three-dimensional;

allowing the user to enter information to tag any of the any avatars with tagged information in response to the physical position of the any avatars being within the predetermined proximity range of the user's avatar;

automatically presenting the tagged information to the user when any of the any avatars that have been previously tagged by the user are within the predetermined proximity range of the user's avatar, wherein the tagged information is only presented to the user and not to users of the any avatars; and allowing the user to turn off automatically presenting the tagged information for a selected previously tagged one or more of the any avatars even if the selected previously tagged one or more avatars is within the predetermined proximity range of the user's avatar.

20. The computer program product of claim 19, wherein the method further comprises determining if the user has previously tagged any avatars with the information in response to any avatars coming within the predetermined proximity range of the user's avatar.

* * * * *